UNITED STATES PATENT OFFICE.

EDWARD RAY SPEARE, OF NEWTON, MASSACHUSETTS, ASSIGNOR, BY MESNE ASSIGNMENTS, TO ECONOMY FOOD PRODUCTS COMPANY, OF CAMBRIDGE, MASSACHUSETTS, A CORPORATION OF MASSACHUSETTS.

FOOD PRODUCT.

1,167,127.      Specification of Letters Patent.      Patented Jan. 4, 1916.

No Drawing.      Application filed April 28, 1915. Serial No. 24,577.

*To all whom it may concern:*

Be it known that I, EDWARD RAY SPEARE, a citizen of the United States, residing at Newton, county of Middlesex, Commonwealth of Massachusetts, have invented certain new and useful Improvements in Food Products, of which the following is a specification.

This invention relates to cereal products and particularly to ready prepared products of the so called breakfast food type having a corrective quality in cases of suppression or sluggishness of the bowels requiring food treatment of a regulating nature. In this class of food, great difficulty has been found in producing an article of diet which would be appetizing and of continued palatability. Inasmuch as the effects of such diet are largely mechanical and somewhat slow, it is of the utmost importance that the ingredients be presented in such a form as to tempt the appetite at the outset and maintain its appeal to the appetite for a sufficiently long period of time for the food to accomplish its purpose.

Various food ingredients have been tried both singly and in combination and articles of well known corrective properties have been employed both singly and in combination. The difficulty has been a double one, first in regard to matters of taste, and second, as to matters of physical form. It so happens that nearly all of the ingredients known to man as correctives are either distasteful or are physically coarse, harsh or otherwise objectionable to the delicate and sensitive surface of the mouth and its organs.

The problem involves the utilization of some edible article having a very considerable non-digestible element which would leave a considerable residue after passing through the digestive tract. This material must of necessity be some inexpensive article, and wheat bran has been found a very desirable element. However, wheat bran is in itself not a sufficiently palatable or sufficiently appealing article to have the necessary dietary qualities. It is moreover coarse and harsh. Furthermore I have found that wheat bran is most effective when eaten raw with its fiber unaffected by cooking and its salt elements unmodified by heat. What has been said about bran generally is true in a most marked degree when the bran is in a raw state. In that condition it is not only unpalatable but is to most people decidedly objectionable both as to taste and also as to form and texture.

It has been known for a long time that the pure honey separated from the wax of the comb has a laxative effect. Honey is by its nature a somewhat expensive article for general usage and has furthermore physical properties and characteristics which make it difficult to use.

My present invention is based on certain discoveries as to the possibilities of use of the natural honey produced by the honey bee used in combination with cereal in an expanded form such as pop corn and mixed with some articles having a suitable non-digestible residue. By treating such an element as pop corn which is bulky, light, and porous with honey, I find it possible to carry this normally sticky element as an externally thin coating film on the surface of the pop corn in such a manner that it readily sugars and partly by penetration and partly by its thin surface coating becomes a non-adhesive element in the combination. This expanded element so treated with the honey has the effect of presenting to the tasting tracts of the mouth a pleasant sweetness over such considerable areas as to produce a complete preponderance of impression of taste so that the accompanying element such as wheat bran will be unobserved during the processes of mastication. The pop corn as well as the bran has a rough and somewhat harsh feeling when brought into contact with the sensitive membranes and tissues. In order to disguise this characteristic I have found it possible to introduce into the combination an element such as corn flakes presenting comparatively large flat areas which produce on the sensitive surfaces an impression of flatness which offsets the impression of roughness produced by the other elements. The resultant sensation as perceived in eating the food is one in which the impression of flatness is predominant. This, coupled with the predominant impression of enjoyable flavor gives the food that appeal which is essential to nourishment and digestion as well as to the corrective purpose of the product.

The details of ingredients, their manner of assemblage and use will be more fully disclosed in the specification which follows.

The breakfast food made in accordance with my invention preferably consists of twenty-five parts by weight of bran, twenty-five parts by weight of rolled corn, commonly known as flakes, and fifty parts by weight of so called "pop" corn, popped and treated with honey.

In treating the corn, which is first popped, and then slightly reduced in size, I take pure bees' honey which is carefully strained to remove any portion of comb, and in a suitable mechanical mixer stir the honey and pop corn together. It is desirable that the pop corn be slightly reduced from the full kernel to a size which approximately will be between one-eight to one-fourth of an inch in diameter, although of course the parts will vary slightly in breaking. The honey is carefully and fully stirred through the entire mass which is preferably treated while warm. This produces on the surface of the granules of corn a very thin coating of honey which partially penetrates the pores of the pop corn and partially dries or sugars on the surface in a thin film. I thus avoid any stickiness in the honey so that the corn thus treated may be freely and completely mixed with the other elements of the food.

An essential element of the mixture is the bran or any well known equivalent which will leave a large undigested residue after passing the digestive tract. The pop corn, while high in nutriment, also leaves a considerable residue, so that its function in my present invention is largely a mechanical one in the mixture, as distinguished from the action of the bran in the intestines.

During the process of mastication, the pop corn, on account of its great bulk, is apparently in very complete predomination. As the honey is spread out over the very considerable area of the expanded flakes of the pop corn, it is prominently and immediately presented to the tongue and other tracts of taste, so that during mastication there is a complete impression of the flavor of the honey without having the honey actually present in such a large amount that it would be too sweet for persons who are undersirably affected by too much sweet. The honey or other flavoring is thus not necessarily present in any such large amount as would so increase the cost of the food as would make its use prohibitive to the ordinary person.

The use of the flake is desirable but not absolutely essential. I have found, as suggested above, that the presence of flattened flakes in a mixture containing the broken flakes of the expanded material such as pop corn is an important element as far as the feeling of the food is concerned during the process of mastication. It will be noted that the pop corn is of necessity slightly rough while the flakes are of a smoother nature and present a considerable flat area counteracting the impression of any less agreeable impression of the rougher flakes and of coarser bran. This element of the flat flakes therefore combines with the element of the expanded and broken portions of the pop corn and of the coarse bran so that the food not only produces a pleasant taste during mastication but produces an agreeable sensation of physical property which makes it an entirely acceptable food and one which has a sustained appeal so that it can be used for a long period without substitution and without palling on the user.

Various modifications may of course be made in the ingredients and other well known articles of food may be substituted in the mixture. It is to be borne in mind however that it is important that there be present for the purposes of producing a predominant flavor an expanded ingredient capable of carrying on its surface an attenuated amount of the flavoring and that it is also desirable where the mass of expanded material is rough or where the bran is coarse to have an ingredient of a flat physical nature so that the impression of the rougher portion is neutralized.

What I therefore claim and desire to secure by Letters Patent is:

1. An article of food of the class described comprising bran and popped corn and bees' honey disposed on the surface of the popped corn.

2. An article of the class described comprising the following elements: bran, substantially twenty-five parts by weight; flaked corn, substantially twenty-five parts by weight; popped corn, substantially fifty parts by weight; and a suitable amount of flavoring material disposed on the surface of the popped corn.

3. An article of human diet comprising the following elements: bran, substantially twenty-five parts by weight; flaked corn, substantially twenty-five parts by weight; popped corn, substantially fifty parts by weight; and a suitable amount of bees' honey disposed on the surface of the popped corn.

4. In an article of food of the class described, bran, a predominating amount of popped corn and a flavoring disposed on the surface of the popped corn.

5. As an article of human diet a food containing bran, corn flakes and popped corn, and bees' honey disposed on the surface of the popped corn.

In testimony whereof I affix my signature in presence of two witnesses.

EDWARD RAY SPEARE.

Witnesses:
ALDEN H. SPEARE,
GEORGE B. DENNET.